(12) United States Patent
Dicke (10) Patent No.: US 7,101,133 B2
(45) Date of Patent: Sep. 5, 2006

(54) THREAD-FORMING SCREW FASTENER (75) Inventor: Robert Dicke, Ennepetal (DE)

(73) Assignee: A-Z Ausrustung Und Zubehor GmbH & Co KG, Hattingen (DE)

( * ) Notice: Subject to any disclaimer, the term of this patent is extended or adjusted under 35 U.S.C. 154(b) by 0 days.

(21) Appl. No.: 10/967,413

(22) Filed: Oct. 18, 2004

(65) Prior Publication Data
US 2005/0186048 A1    Aug. 25, 2005

(30) Foreign Application Priority Data
Feb. 25, 2004   (DE)   ................ 20 2004 002 877 U (51) Int. Cl.
F16B 25/10   (2006.01)
F16B 39/30   (2006.01)
F16B 35/04   (2006.01)

(52) U.S. Cl. ................ 411/387.4; 411/387.5; 411/386; 411/308; 411/411; 411/309; 411/310

(58) Field of Classification Search ........... 411/387.4, 411/87.5, 386, 308, 411, 309, 310
See application file for complete search history.

(56) References Cited

U.S. PATENT DOCUMENTS 1,250,748 A * 12/1917 Woodward ............... 411/309
2,301,181 A * 11/1942 Ilsemann ............... 411/309
2,867,786 A *  1/1959 Doetsch et al. ........... 439/87

(Continued)

FOREIGN PATENT DOCUMENTS

DE    84 09 108.8    7/1984

(Continued)

Primary Examiner—Robert J. Sandy
Assistant Examiner—David Reese
(74) Attorney, Agent, or Firm—Brinks Hofer Gilson & Lione (57) ABSTRACT

The invention relates to a screw fastener comprising a threaded shank having a force application means for torque transmission and a screw fastener point. The threaded shank consists of a shank core and a self-tapping thread, and the thread is designed as a prominence which runs helically over the shank core, is defined by two flanks meeting in an outer thread edge and has a radial height (H). The outer thread edge, at least in a section of the thread, runs in a wavelike manner in the radial direction with an amplitude between wave crests having the height (H) and wave troughs having a height (h) reduced by the amplitude. The thread, at least in the region of one of its flanks, has niches in the region of the wave troughs of the thread edge, which niches interrupt the surface of the flank and their outer boundary is the thread edge, the thread in each case having a certain first apex angle ($\alpha$), formed between the flanks, in those regions of the wave crests of the thread edge which are not interrupted by niches and a second apex angle ($\alpha'$) in the deepest regions of the wave troughs of the thread edge. The first apex angle ($\alpha$) between the flanks is approximately within the range of 30° to 35°, the second apex angle ($\alpha'$) being 30° up to at most 58°.

19 Claims, 5 Drawing Sheets

U.S. PATENT DOCUMENTS

| | | | | |
|---|---|---|---|---|
| 3,238,836 | A | * | 3/1966 | Johnson .................... 411/387.4 |
| 3,982,575 | A | * | 9/1976 | Ollis et al. .................. 411/310 |
| 4,273,175 | A | * | 6/1981 | Capuano .................... 411/168 |
| 5,044,853 | A | * | 9/1991 | Dicke ......................... 411/311 |
| 5,110,245 | A | * | 5/1992 | Hiroyuki .................... 411/421 |
| 5,827,030 | A | * | 10/1998 | Dicke ....................... 411/387.4 |
| 5,897,280 | A | * | 4/1999 | Dicke ........................ 411/411 |
| 6,254,327 | B1 | * | 7/2001 | Chen ......................... 411/411 |
| 6,698,987 | B1 | * | 3/2004 | Dicke ....................... 411/387.6 |
| 6,926,484 | B1 | * | 8/2005 | Kram et al. ................. 411/311 |

FOREIGN PATENT DOCUMENTS

| | | |
|---|---|---|
| DE | 33 35 092 A1 | 4/1985 |
| EP | 0 394 719 B1 | 9/1992 |

* cited by examiner

THREAD-FORMING SCREW FASTENER

CROSS REFERENCE TO RELATED APPLICATION

This application claims priority to German Utility Model application number 20 2004 002 877.8 filed Feb. 25, 2004.

BACKGROUND OF THE INVENTION

The present invention relates to a screw fastener comprising a threaded shank having a force application means for torque transmission and a screw fastener point. The threaded shank consisting of a shank core and a self-tapping thread, and the thread being designed as a prominence which runs helically over the shank core, is defined by two flanks meeting in an outer thread edge and has a height measured radially between the core and the thread edge. The outer thread edge, at least in a section of the thread, running in a wavelike manner in the radial direction with a certain amplitude between wave crests having the thread height and wave troughs having a height reduced by the amplitude, and the thread, at least in the region of one of its flanks, having niches in the region of the wave troughs of the thread edge. The niches interrupt the surface of the flank and their outer boundary is the thread edge, the thread in each case having a certain first apex angle, formed between the flanks, in those regions of the wave crests of the thread edge which are not interrupted by niches and a second apex angle in the deepest regions of the wave troughs of the thread edge.

Such a screw fastener is described in DE 33 35 092 A1. It has proved to be very effective in practice, since a high release torque at a low insertion torque is achieved. The thread runs up to the end of the screw fastener point, it being designed with the niches and the wavelike thread edge, starting from the screw fastener point, at least over the first adjoining thread turn. As a result, the point acts as a type of reaming tool, the thread forming being effected directly at the point, so that reliable centering and biting in the workpiece results directly when applying the screw fastener. In this known screw fastener, the niches are formed as paraboloids symmetrically to the center line of the wavelike thread edge.

EP 0 394 719 B1 likewise describes a thread-forming screw fastener of the generic type, in which, however, the niches are designed to be asymmetrical in such a way that their front flank surfaces in the insertion direction are steeper than the rear flank surfaces in the insertion direction. As a result, a further reduction in the insertion torque with a simultaneous increase in the release torque is achieved. During the insertion, the resistance due to the flatter design of the rear parabolic parts in the insertion direction is lower, whereas the release of the screw fastener is made more difficult on account of the steeper arrangement of the parabolic areas lying at the front in the insertion direction.

The object of the present invention is to improve a screw fastener of the generic type in such a way that the insertion torque is reduced even further, but a high release torque is also ensured at the same time. In this case, the screw fastener is to be conceived with optimized properties, on the one hand for inserting into softer materials, such as wood and the like, in particular without pilot drilling and thus in a self-piercing manner, or on the other hand for inserting into harder materials, e.g. plastics and metals, in particular into a core hole.

SUMMARY OF THE INVENTION

According to the invention, this is achieved in that the first apex angle between the flanks in their uninterrupted regions of the wave crests is approximately within the range of 30° to 35°, and in that the second apex angle in the region of the niches and wave troughs is 30° up to at most 58°. According to the invention, the apex angles are therefore smaller compared with the prior art, thereby resulting in a slimmer thread profile, so that the tapping torque during the insertion is favorably influenced by virtue of the fact that the thread more easily forms a mating thread in the respective material by material displacement, i.e. essentially without chip formation. In this case, a difference in angle between the first and second apex angles should be as small as possible or even zero, i.e. the second apex angle in the region of the wave troughs and the niches should be as small as possible in order to keep the tapping torque small due to a slim profile form. A continuous, virtually edge-free transition between the thread flanks and niches is also advantageous in this case.

In addition, or else as an alternative, provision is made as a further solution according to the invention for the size of the amplitude of the wavelike thread edge to be varied in relation to various intended uses of the screw fastener.

For use for inserting into softer materials, such as wood or other fibrous materials and composite materials, the amplitude of the wavelike thread edge is about 0.2 to 0.4 times the thread height. The softer and the more compliant the material, in one embodiment of the invention the greater the amplitude can be (and vice versa). According to another embodiment for use for inserting into harder materials, in particular plastics or metals, the amplitude of the thread edge is about 0.05 to 0.15 times the thread height. The harder and more resistant the material, the smaller the amplitude should be (and vice versa).

A further measure according to the invention relates to the radially measured depth of the niches. For use for inserting into softer materials, this depth is obtained from the thread height multiplied by the factor greater than/equal to 0.8. This factor may advantageously be about 0.8 but may also approach 1.0. For harder materials, the radial depth of the niches is preferably about 0.2 to 0.3 times the thread height.

The number of wave crests and wave troughs per thread turn, i.e. the circumferential angular distance or angular pitch of the wave crests, also has a further effect on the screw properties. For use for inserting into softer materials, the angular pitch should be within the range of 30° to 45°, thereby resulting in a number n of 8 to 12 wave crests and wave troughs, respectively, per thread turn (360°). For use in harder materials, the angular pitch is within the range of 15° to 24°, thereby resulting in a number n of 15 to 24 wave crests and wave troughs, respectively.

In particular in combination with one or more of the inventive features explained, it is advantageous if the thread of single-start design in practice has a pitch which is about 0.5 times the outer thread diameter (screw fastener nominal diameter). In this way, increased feed for quicker insertion is achieved. Nonetheless, according to the invention, a high release torque for lasting prestress of the screwed connection is ensured.

Further advantageous configurations of the invention are contained in further claims and in the description below.

It may be mentioned at this point that all the measures according to the invention can be applied independently of one another but also with one another in any possible or appropriate combination.

BRIEF DESCRIPTION OF THE DRAWINGS

The invention is to be explained in more detail with reference to several exemplary embodiments illustrated in the drawing, in which.

DETAILED DESCRIPTION OF THE INVENTION

In the various figures of the drawing, the same parts are always provided with the same reference numerals and are therefore as a rule only described once in each case.

Figure 1:
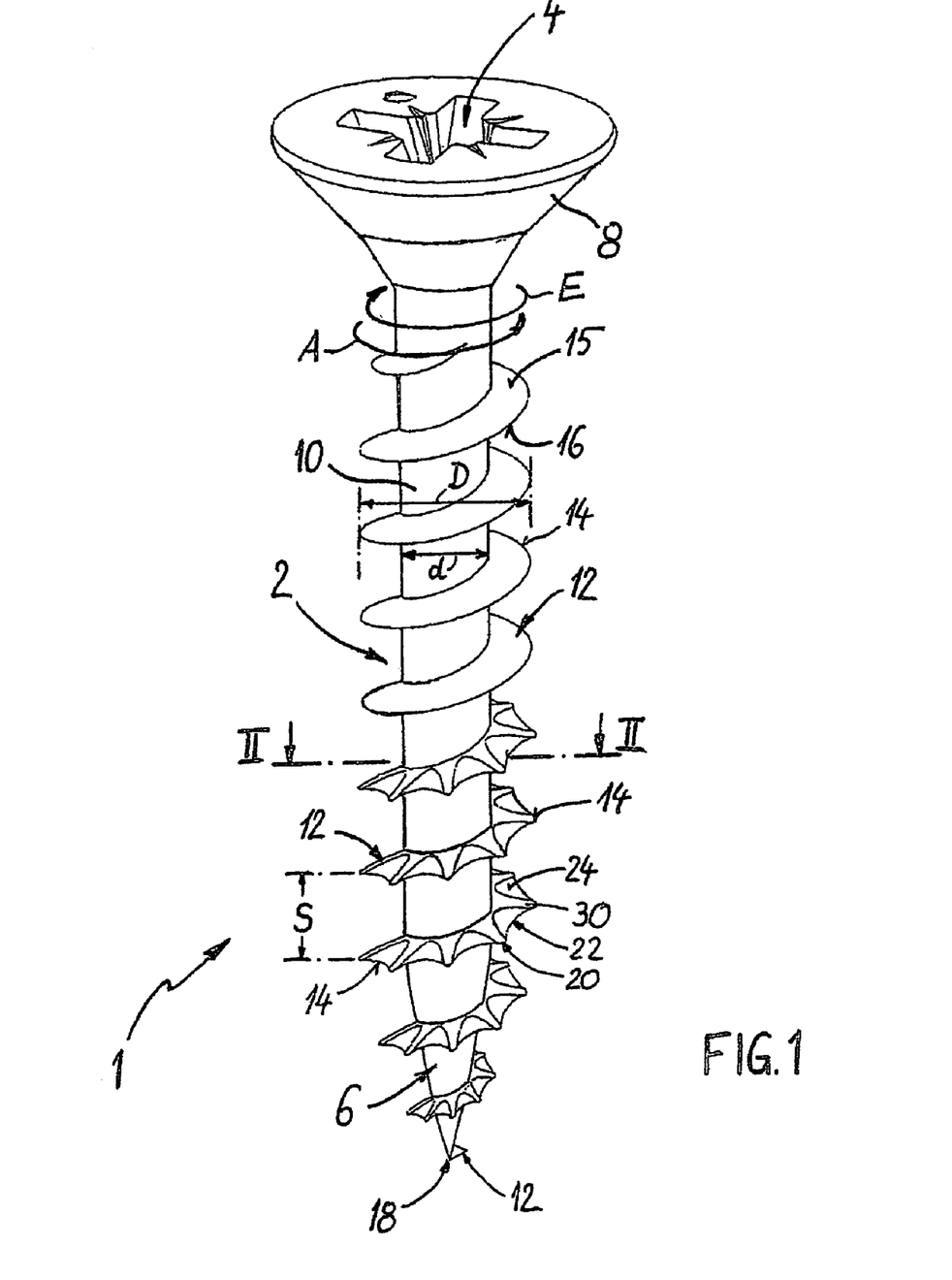
FIG. 1 shows a greatly enlarged, slightly perspective side view of a screw fastener according to the invention.

As can be seen first of all from FIG. 1, a screw fastener 1 according to the invention consists of a threaded shank 2 having a force application means 4 at one end for torque transmission and an opposite screw fastener point 6. In the example shown, the force application means 4 is designed in the form of a recess as an internal force application means, here purely by way of example as a cross recess, in a screw fastener head 8 designed as a countersunk head. The threaded shank 2 consists of a preferably cylindrical shank core 10 having a core diameter d (see also FIG. 2) and a self-tapping, in particular single-start, thread 12 having an outer thread diameter (screw fastener nominal diameter) D (FIGS. 1 and 2), this thread 12 being designed as a prominence (only one prominence) running helically at least over part of the shank core 10 and over the screw fastener point 6, this prominence being defined by two flanks 15, 16 meeting in an outer thread edge 14 and preferably running in each case approximately rectilinearly in the radial direction. At any rate, the thread 12 in this case runs up to the front, pointed end 18 of the screw fastener point 6. In the example shown, it runs over the entire shank core 10 virtually up to the screw fastener head 8 ("full thread"). However, the screw fastener 1 may also be designed with a partial thread, i.e. with a thread-free shank section adjacent to the screw fastener head 8. The thread 12 is normally designed as a right-hand thread, so that an insertion direction (arrows E) corresponds to the clockwise direction (when looking down on screw 1). The opposite unscrewing direction is depicted by arrows A. In the region of the screw fastener point 6, the core 10 tapers approximately conically from the core diameter d up to the pointed end 18.

As can be seen from FIGS. 2 to 9, the outer thread edge 14, at least in a section of the thread 12, runs in a wavelike manner in the radial direction with a certain amplitude U between wave crests 20 and wave troughs 22. In the region of the wave crests 20, the thread 12 has a height H measured radially between the shank core 10 and the thread edge 14. In the region of the wave troughs 22, this height H is reduced to a height h by the amplitude U. It follows that: U=H−h. At least in the region of one of the flanks 15, 16, to be precise in particular at least in the region of the flank 16 facing the screw fastener point 6 or 18, the thread 12 has niches 24 in the region of the wave troughs 22 of the thread edge 14, which niches 24 interrupt the surface of the respective flank 15, 16 and their outer radial boundary is the thread edge 14. These niches 24 have surfaces which run rectilinearly (FIGS. 3, 4) or concavely (see FIG. 5) in the radial direction and in a concavely arched manner in the circumferential or rotational direction of the screw fastener. Furthermore, it can be seen in particular from FIGS. 3 to 5 that the thread 12 in each case has a certain first apex angle α, formed between the flanks 15, 16 running essentially rectilinearly in the radial direction, in those regions of the wave crests 20 of the thread edge 14 which are not interrupted by niches 24 and a second apex angle α' in the deepest regions of the wave troughs 22 of the thread edge 14 in the region of the niches 24.

According to the invention, the first apex angle α between the uninterrupted flanks 15, 16 is approximately within the range of 30° to 35°. In this case, the second apex angle α' in the region of the niches 24 is 30° up to at most 58°.

Figures 2, 3:
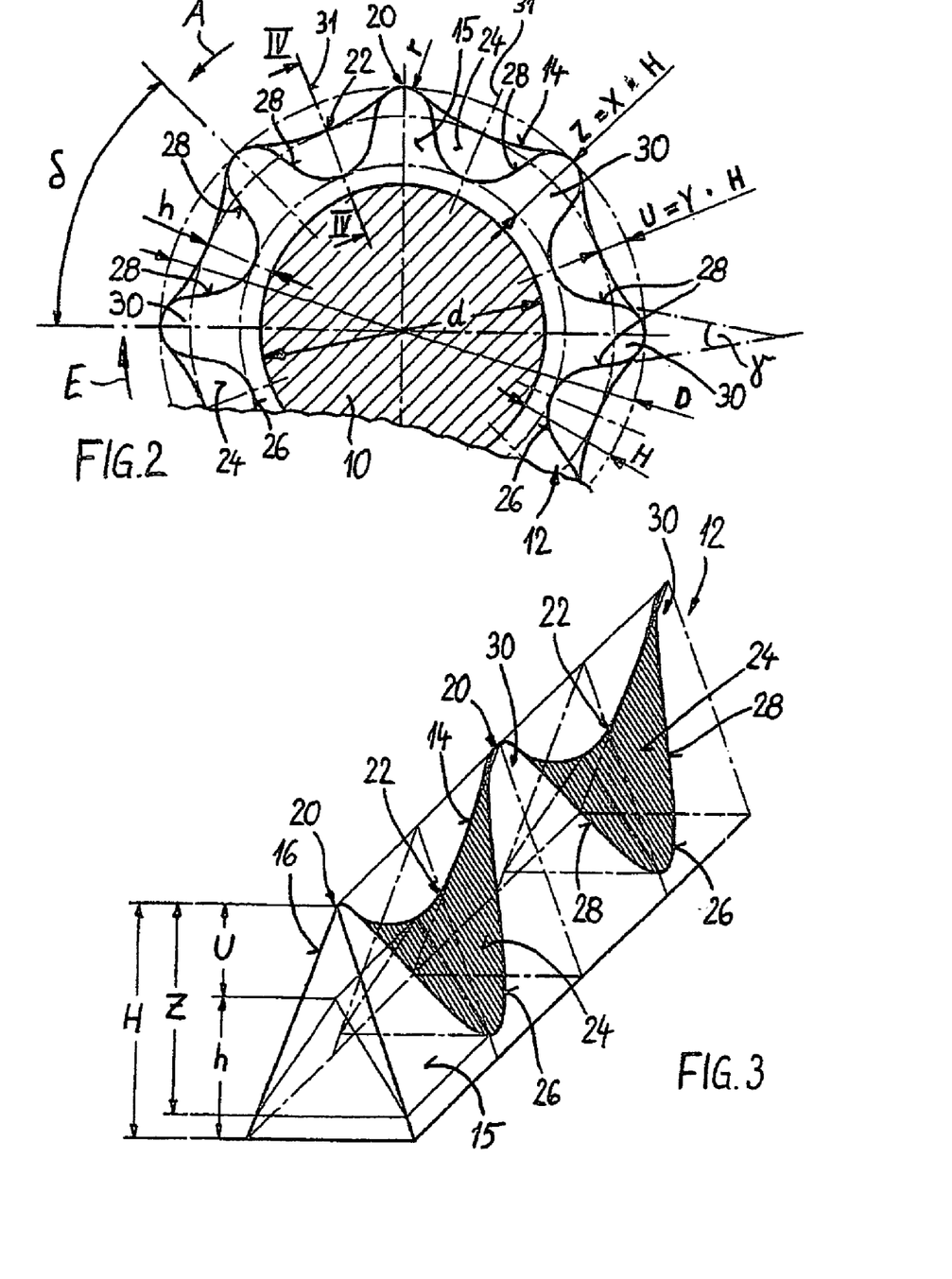
FIG. 2 shows a further enlarged cross section in the plane II—II according to FIG. 1, to be precise in a first embodiment for use in softer materials.
FIG. 3 shows a perspective illustration of a developed view of the thread.
Figure 4:
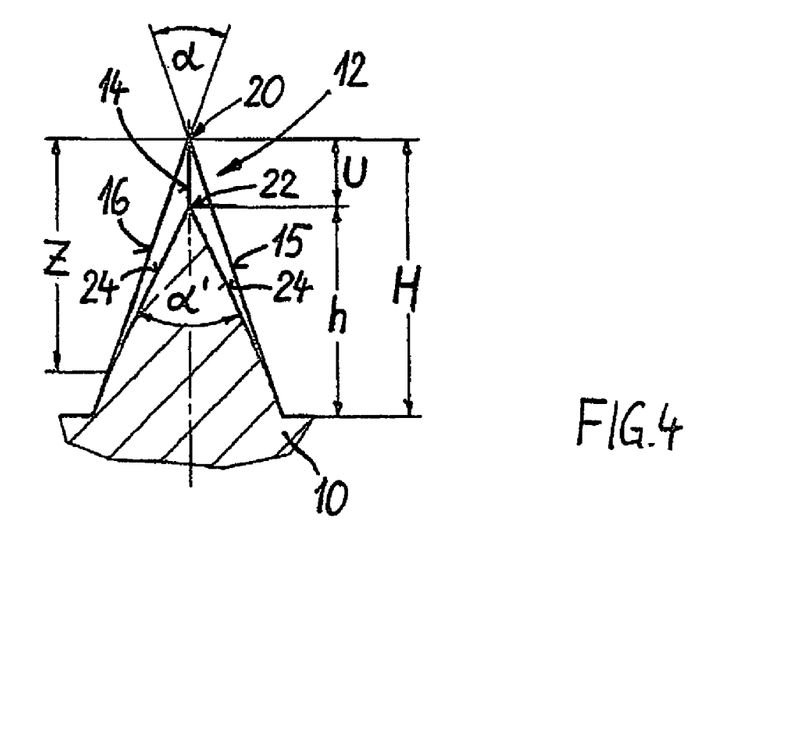
FIG. 4 shows an enlarged cross section through the thread in the region of a wave trough in the plane IV—IV according to FIG. 2.

In a first embodiment according to FIGS. 3 and 4, the surfaces of the niches 24 run essentially rectilinearly as viewed in the radial direction. It follows from this that the second apex angle α' is at any rate larger than the first apex angle α; the second apex angle α' should then be about 35° up to at most 58°, but at the same time should be as small as possible in the interest of a low tapping torque.

Figure 5:
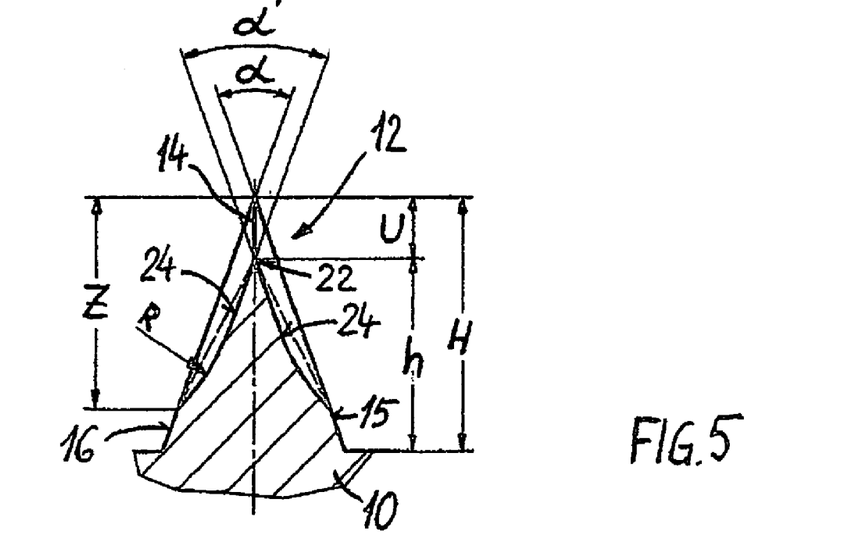
FIG. 5 shows an illustration analogous to FIG. 4 in an alternative embodiment.

In the advantageous embodiment according to FIG. 5, the surfaces of the niches 24 are also concavely curved in the radial direction in each case at least over part of their radial extent, a factor which is indicated by way of example with a radius of curvature R. However, this need not involve a circular arc curvature, but rather any desired curve shapes, e.g. parabolic, are possible. This embodiment has the advantage that the second apex angle α' effectively resulting between applied tangents at the thread edge 14 in the wave trough 22 can be reduced even more markedly by a suitable curvature shape. According to FIG. 5, α and α' are approximately the same size; for example they can both be within the range of about 30° to 35°.

A further aspect according to the invention is the size of the amplitude U of the wavelike thread edge 14. For a design of the screw fastener 1 for use for inserting into softer materials, such as wood or the like, the amplitude U should be about 0.2 to 0.4 times the thread height H. This can be expressed mathematically by the relationship U=Y·H, where Y=0.2 to 0.4. In this respect, reference is made to the embodiments illustrated in FIGS. 2 to 7.

In contrast, the amplitude U for use of the screw fastener 1 for inserting into harder and more resistant materials, in particular plastics or metals, is about 0.05 to 0.15 times the height H, i.e., in said relationship U=Y·H, Y=0.05 to 0.15. In this respect, reference is made to the embodiments according to FIGS. 8 and 9.

As can also be seen from the figures of the drawing, in particular from FIGS. 2 to 5, the niches 24, starting from the thread diameter D determined by the wave crests 20 of the thread edge 14, each have a depth Z which is measured inwardly in the radial direction and is at any rate at least slightly smaller than the height H of the thread 12. As a result, the thread 12, in the region of its thread root, has flanks 15, 16 uninterrupted over a certain height H–Z.

According to a further aspect of the invention, this depth Z of the niches 24 is likewise designed in adaptation to the use of the screw fastener 1. For softer materials, the depth Z of the niches 24 is to be at least 0.8 times the thread height H; thus Z=X·H, where X=0.8. In this case, Z may even approach H, for example, the embodiments according to FIGS. 6 and 7.

In embodiments for harder materials (for example FIGS. 8 and 9), in said relationship Z=X·H, the factor X is about 0.2 to 0.3.

Yet another aspect of the invention relates to the number of wave crests 20 and wave troughs 22, respectively, per thread turn of 360°. The wave crests 20 (and of course also the wave troughs 22) are at a distance from one another in the circumferential direction in each case by an angular pitch δ. In this case, provision is now made according to the invention for the angular pitch δ to be within the range of 30° to 45° for use for softer materials. Thus, according to the relationship n=360°/δ, the number of wave crests and wave troughs, respectively, is n=8 to 12 for softer materials. For a design of the screw fastener 1 for use in harder materials, the angular pitch δ is within the range of 15° to 24°, so that there is a number n of 15 to 24 wave crests 20 and wave troughs 22, respectively, per thread turn.

The niches 24 are each separated from the adjoining surface of the respective flank 15, 16 by a boundary line 26. Here, this boundary line 26 essentially has the shape of a parabola with lateral, approximately "V"-shaped boundary sections 28. Due to this contour, a thread section 30 with complete flanks 15, 16 is formed in each case between two adjacent niches 24 in the region of the wave crests 20. In this case, the boundary sections 28, lying on both sides of each complete thread section 30 of that kind, of the adjacent niches 24 enclose an angle γ, which should be within the range of 30° to 90°, the boundary sections 28 in the region of each wave crest 20 merging into one another via a rounded portion having a radius r=(0.1 to 0.3)·H.

Figure 6:
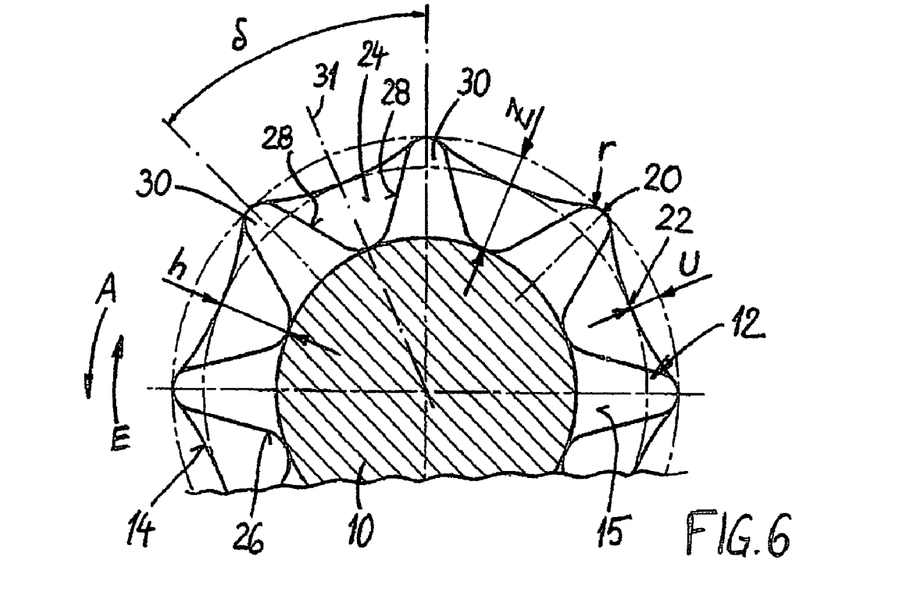
FIG. 6 shows an illustration analogous to FIG. 2 of a further embodiment for softer materials.
Figure 8:
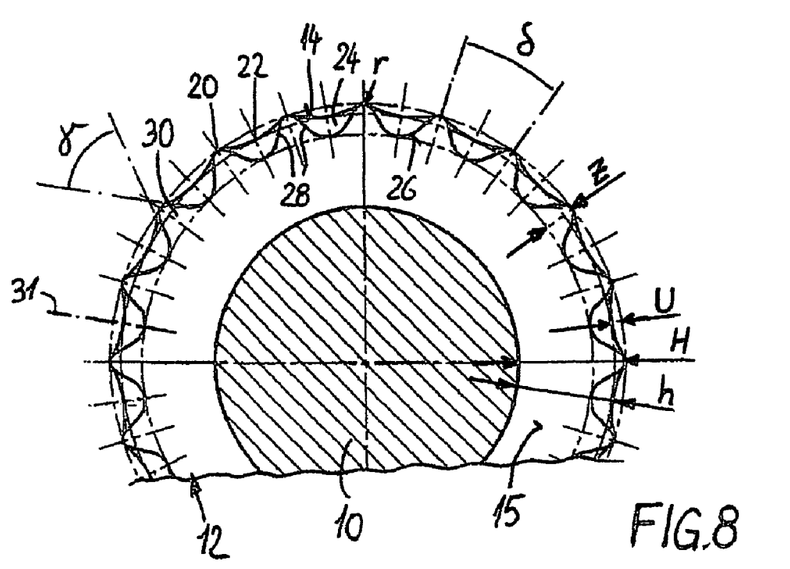
FIG. 8 shows an embodiment conceived for use in harder materials in an illustration analogous to, inter alia, FIG. 2, with symmetrical niches.

In the embodiments according to FIGS. 2, 6 and 8, the niches are each designed to be symmetrical in such a way that their lateral boundary sections 28 in each case run at the same angle to a radial axis 31 of the niche 24 in insertion direction E and unscrewing direction A of the screw.

Figure 7:
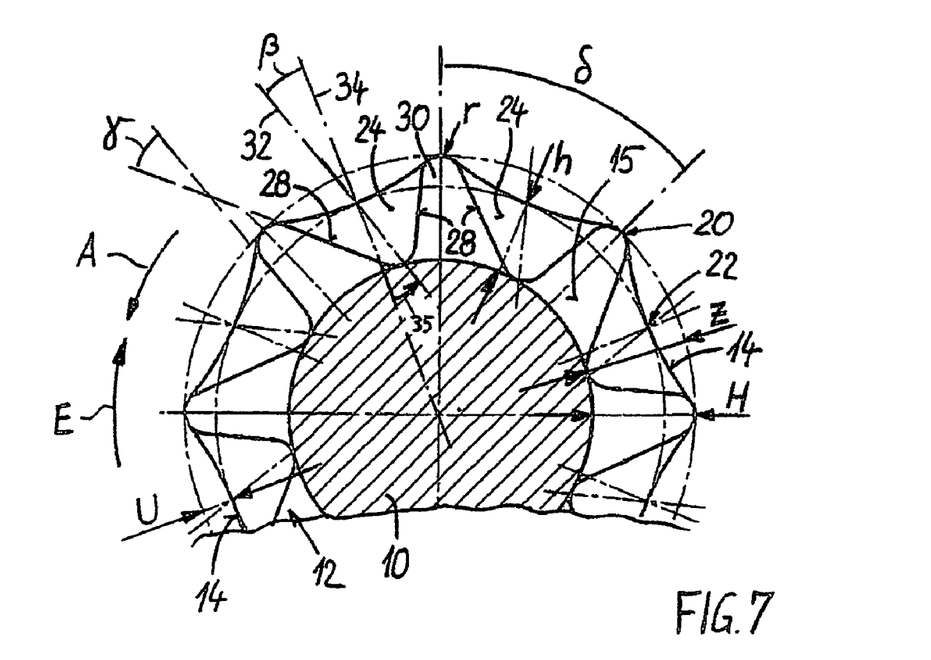
FIG. 7 shows a third embodiment likewise for softer materials in an illustration analogous to FIG. 2 or 5, but with asymmetrical niches.
Figure 9:
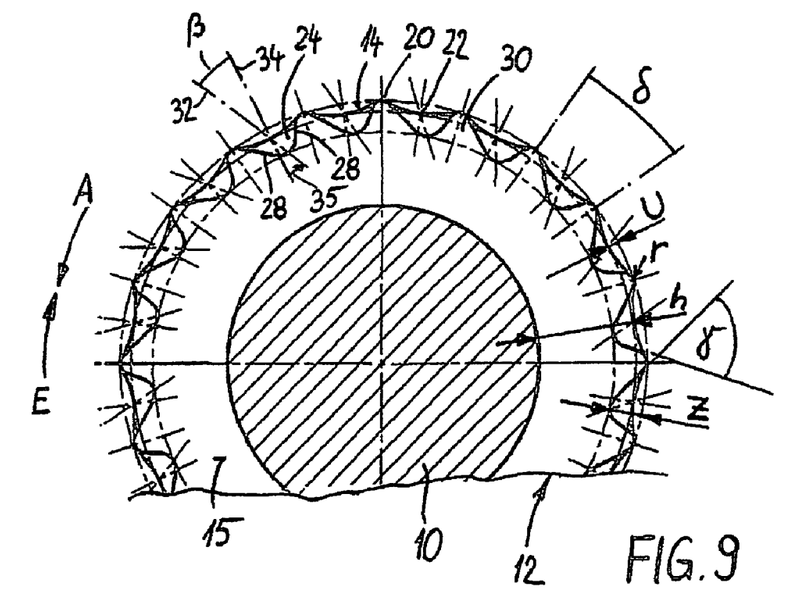
FIG. 9 shows an embodiment analogous to FIG. 8, but with asymmetrical niches.

In contrast, in the embodiments according to FIGS. 7 and 9, provision is made for each niche to be designed to be asymmetrical in such a way that the front boundary line 28 in the insertion direction E is steeper than the rear boundary line 28, an axis 32 of the niche 24 being offset in insertion direction E by an acute angle β relative to a radial center line 34 of the wave trough 22 of the thread edge 14 (in this respect see the arrow 35 depicted in each case in FIGS. 7 and 9). The angle β should be approximately within the range of 10° to 25°.

In an advantageous configuration of the screw fastener 1 according to the invention, the thread 12 running according to FIG. 1 up to the end 18 of the screw fastener point 6 is designed with the niches 24 and the wavelike thread edge 14 starting from the end 18 and over the screw fastener point 6 and at least over the first thread turn adjoining in the region of the cylindrical core 10. Furthermore, the niches 24 are preferably formed axially opposite one another on both flanks 15 and 16 of the thread 12. In the region of the screw fastener point 6 toward its end 18, the distance between the niches 24 or the complete thread sections 30 can become successively smaller and smaller.

As can also be seen from FIG. 1, the thread 12 is preferably designed as a single-start thread in practice having a pitch S which, on account of the features according to the invention, may be relatively large with at least about 0.5 times the thread diameter D. Furthermore, it is advantageous if the screw fastener point 6 is designed as a "self-piercing" point. To a certain extent, this is already achieved solely by the described configuration of the thread 12 running up to the pointed end 18, since the point 6 acts in this way as a type of reaming tool during rotation. In addition, the core of the point 6 may have, for example, axial, rib-shaped milling elements (milling ribs) (not shown).

Finally, it may be mentioned that deviations, in particular due to production, from the ideal configuration features described and shown here may occur in practice. This applies in particular to the profile of the thread edge 14 and/or the boundary line 26, which, deviating from the sinusoidal illustration, may also occur, for example, with approximately rectilinear sections in the region of the wave troughs and/or with an irregular profile. Furthermore, the thread edge 14 may also be formed with a narrow surface or with a small radius of curvature instead of with a sharp, knife-edge-like point between flanks.

The invention is not restricted to the embodiments shown and described but comprises all embodiments having the same effect within the scope of the respective invention.

The invention claimed is:

1. A screw fastener comprising a force application means for torque transmission and ending in a screw fastener point, said screw fastener also consisting of a shank core and a self-tapping thread that follows a helical path over an outer surface of said shank core, and characterized by two flanks meeting in an outer thread edge having a radial flank height defined between the outer thread edge and the outer surface of the shank core and;

wherein the self-tapping thread runs in a wavelike manner along the helical path of the outer thread edge, the self-tapping thread including wave crests with a maximum radial flank height and a maximum thread thickness; wave troughs with a minimum radial flank height and a minimum thread thickness which define a boundary line between the wave crests and the wave troughs, the maximum radial flank height being larger than the minimum radial flank height, with a difference between the maximum radial flank height and the minimum radial flank height defining an amplitude and, wherein at least one of the flanks has a plurality of radially extending niches in one of the wave troughs, having a beginning at the outer thread edge and having an end at the boundary line, the distance between the beginning and the end defining a radial depth and, wherein the self-tapping thread is further characterized by a first apex angle, formed between the flanks near the wave crests of the thread edge in an area not interrupted by niches, and a second apex angle formed within the niches, between the interrupted surfaces of the flanks near the minimum radial flank height of the wave troughs of the thread edge, the first apex angle being approximately 30° to 35°, and the second apex angle being approximately 30° to 58°.

2. The screw fastener as claimed in claim 1, wherein the niches have essentially rectilinearly running surfaces in the radial direction, the second apex angle being larger than the first apex angle and being approximately within the range of 35° to 58°.

3. The screw fastener as claimed in claim 1, wherein at least sections of the niches have concave surfaces in the radial direction, the second apex angle being approximate to the magnitude of the first apex angle.

4. The screw fastener as claimed in claim 1, wherein the amplitude of the self-tapping portion is about 0.2 to 0.4 times the radial flank height.

5. The screw fastener as claimed in claim 1, wherein the amplitude of the self-tapping portion is about 0.05 to 0.15 times the radial flank height.

6. The screw fastener as claimed in claim 1, wherein the niches, starting from a thread diameter determined by the wave crests of the thread edge, each have a depth in the radial direction and is smaller than the radial flank height.

7. The screw fastener as claimed in claim 1, wherein the radial depth of the niches is about 0.8 to 1 times the radial flank height.

8. The screw fastener as claimed in claim 1, wherein the radial depth of the niches is about 0.2 to 0.3 times the radial flank height.

9. The screw fastener as claimed in claim 1, wherein the wave crests are at a distance from one another in the circumferential direction by an angular pitch within a range of 30° to 45°.

10. The screw fastener as claimed in claim 1, wherein the wave crests are at a distance from one another in the circumferential direction by an angular pitch within a range of 15° to 24°.

11. The screw fastener as claimed in claim 1, wherein the niches are each separated from the adjoining surface of the flank by the boundary line, the boundary line comprising both a front and rear line, essentially defining a parabola resulting in lateral, approximately V-shaped boundary sections, a thread section which is uninterrupted with regard to its flanks being formed between two adjacent niches near the maximum radial flank height of the wave crests, and the V-shaped boundary sections lying on both sides of the thread section enclosing an angle which is within a range of 30° to 90°.

12. The screw fastener as claimed in claim 1, wherein the boundary sections of each wave crest merge into one another via a rounded portion having a radius which corresponds approximately to 0.1 to 0.3 times the radial flank height.

13. The screw fastener as claimed in claim 1, wherein each niche is designed to be symmetrical in such a way that the angle of the boundary sections in each case correspond to an angle of a radial axis of the niche in both insertion and removal directions of the screw.

14. The screw fastener as claimed in claim 1, wherein the niches are designed to be symmetrical in such a way that the front boundary line is steeper than the rear boundary line, and an axis of the niches being offset in an insertion direction by an acute angle relative to a radial center line of the wave trough of the thread edge, this angle being approximately within a range of 10° to 25°.

15. The screw fastener as claimed in claim 1, wherein the thread runs up to an end of the screw fastener point, the thread being designed with the self-tapping portion starting at the screw fastener point and continuing along the thread through at least one adjoining thread turn.

16. The screw fastener as claimed in claim 1, wherein the niches are formed opposite one another on both flanks of the thread.

17. The screw fastener as claimed in claim 1, wherein the niches are spaced apart by a distance and the distance becomes progressively smaller as the self-tapping portion approaches the screw fastener point.

18. The screw fastener as claimed in claim 1, wherein a thread of single-start design has a pitch which is about 0.5 times the outer thread diameter.

19. The screw fastener as claimed in claim 1, wherein the screw fastener point is designed with self-piercing properties.

* * * * *